J. H. IRWIN.
POULTRY HOUSE.
APPLICATION FILED JAN. 24, 1908.

901,535.

Patented Oct. 20, 1908.

Witnesses

Inventor
J. H. Irwin
By Dudley, Browne & Phelps.
Attorneys

UNITED STATES PATENT OFFICE.

JAMES H. IRWIN, OF HIGHMORE, SOUTH DAKOTA.

POULTRY-HOUSE.

No. 901,535.   Specification of Letters Patent.   Patented Oct. 20, 1908.

Application filed January 24, 1908. Serial No. 412,370.

*To all whom it may concern:*

Be it known that I, JAMES H. IRWIN, citizen of the United States, residing at Highmore, in the county of Hyde and State of South Dakota, have invented certain new and useful Improvements in Poultry-Houses, of which the following is a specification.

My invention relates to certain new and useful improvements in poultry houses, and the object of my invention is to provide a house of this character which can be cheaply constructed and in which the best care can be taken of the poultry with a minimum expenditure of time and labor.

Other objects of my invention will be hereinafter described.

My invention consists in certain constructions, combinations and arrangements of parts, the preferred form of which will be first described in connection with the accompanying drawings, and then the invention particularly pointed out in the claims.

Figure 1:
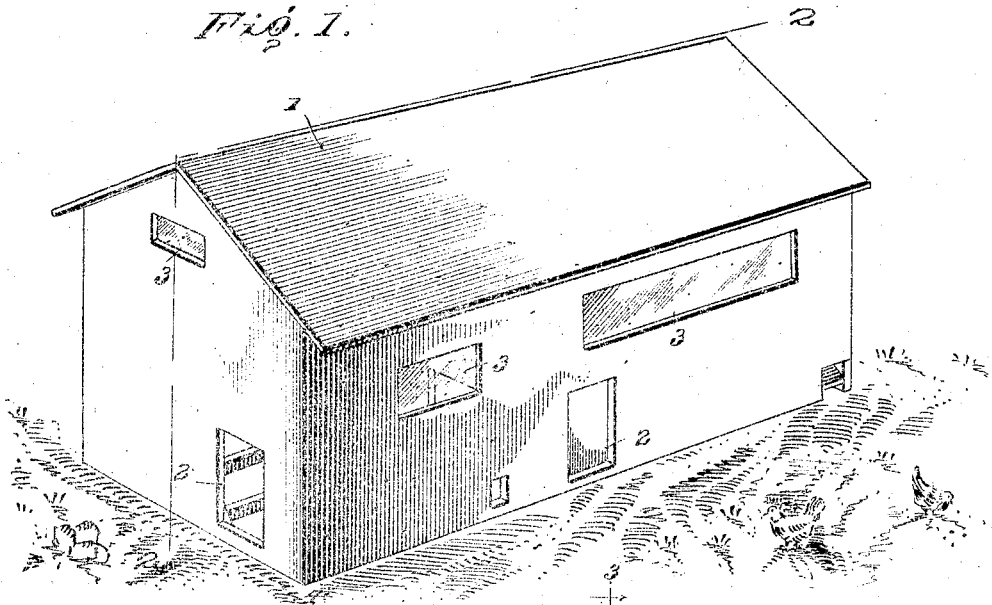
Figure 2:
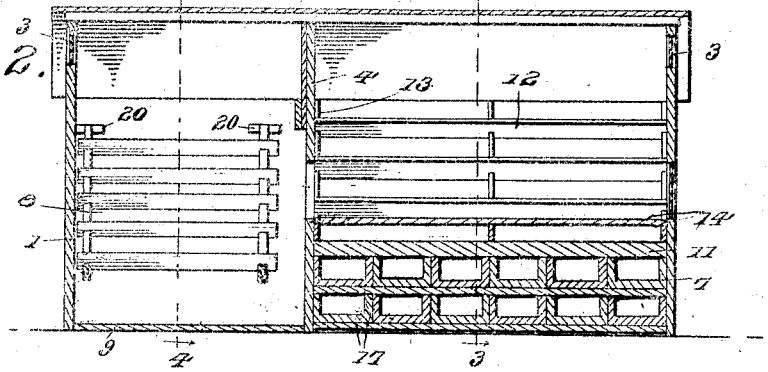
Figure 3:
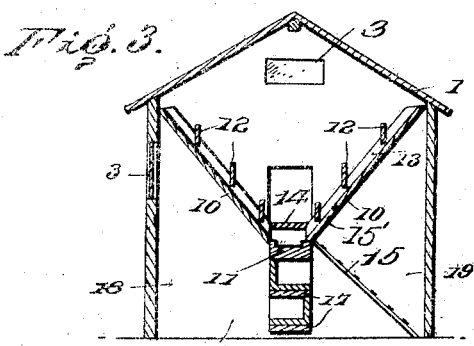
Figure 4:
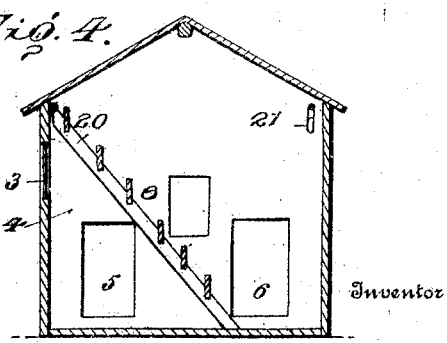

Referring to the drawings wherein I show the preferred form of my invention and wherein the same part is designated by the same reference numeral wherever it occurs Figure 1 is a perspective view partly broken away; Fig. 2 is a central longitudinal section taken on line 2, 2 of Fig. 1; Fig. 3 is a cross section taken on line 3, 3 of Fig. 2, and Fig. 4 is a cross section taken on line 4, 4 of Fig. 2.

1 designates the house which is provided with suitable doors 2 and windows 3. The house is divided transversely by a partition 4, having the doors 5, 6 cut therethrough. This divides the house into two sections and 8, the section 7 being for the full-grown poultry while the section 8 is for the young. As will be seen the section 7 preferably has no floor, whereas the section 8 is provided with a tight floor 9.

10 are inclined floor sections which run from the meeting lines of the roof and side walls toward the longitudinal center of the house. At their lower ends they are connected together by the narrow horizontal section 11, thus dividing the section 7 of the building into two stories. On the upper side of the floor sections 10 I mount the perches 12, the perches being supported out of contact with the section 10 by the supports 13. The horizontal section 11 forms a trough which will receive all the droppings, and 14 is a board forming a walk mounted over the trough.

15 is a run-way leading from the lower portion of the house to an opening 15', whereby the poultry can have access to the roosting room.

17, 17 are two shelves running lengthwise of the section 7 and arranged below the section 11. On these shelves are placed the nests which are formed of boxes open at the top and one end. These nests practically fill the space between the bottom of the section 10 and the ground, so that a partition is formed which divides the lower portion of the section into two rooms 18 and 19, room 18 being that ordinarily occupied by the poultry and the room 19 being the one devoted for the use of the sitting hens. Normally the nests are placed with their open side facing into the room 18, and when a hen is found sitting the nest can be drawn out, turned around and replaced on its shelf which places the hen into the room 19 without having to disturb her. As the room 19 is only occupied by hens who are sitting, they are not disturbed by the other poultry. As soon as the chickens are hatched and are strong enough to be moved they are taken through the door 6 leading from the room 19 into the section 8, which is the brooding room. In this room several sets of chickens may be put under the care of a single hen. In this room I hinge near the roof, on one side, the roost 20, which, when the chickens are very young, is held at the top of the room by means of the hook 21. When, however, the chickens have grown sufficiently this roost is let down into the position shown.

It will thus be seen that I have devised a construction of poultry house in which perfect care can be taken of the poultry, and, because of the separation of the sitting hens from the others they are not interfered with, and it is possible to obtain better results in hatching the chickens than is possible even with an incubator. The brood house which, as before stated, is floored, is safe from interference by rats or other animals.

By having the roosting section separated from the section occupied by the poultry in the daytime, the poultry is kept cleaner and in better condition. When the poultry is at roost they are in a comparatively contracted space, whereby even in cold weather they have no trouble in keeping warm.

When it is desired to clean the roosting section the walk is removed through the end doors 16, and then the trough and inclined flooring can be readily cleaned. Preferably, and as shown, the perches are removable, in order to facilitate the cleaning operation.

While I have described what I believe to be the preferred form of my invention, I desire to have it understood that many changes may be made in the form, construction and arrangement of parts without departing from the spirit of my invention.

What I claim as new and desire to secure by Letters Patent is

1. In a poultry house the combination with inclined floor sections, of a trough formed between the lower edges of the sections and secured thereto, perches mounted over the sections whereby a room separate from the remainder of the house is formed, and a foot walk supported over the trough.

2. A poultry house provided with a partition formed of inclined floor sections dividing the house into an upper and lower section, shelves arranged below the partition, removable nests having an open end and top mounted on the shelves whereby a partition is formed which divides the lower section of the house into two compartments and into either of which the open side of the nests may be caused to face.

3. A poultry house provided with partitions which divide the house into three rooms, one of which is floored to form a brooding section, the partition between the other two rooms being partly formed of nests having an open end and shelves upon which the nests are removably mounted whereby the nests may be made to face either of said last mentioned rooms, and doors connecting each of said last mentioned rooms with said brood room.

In testimony whereof I affix my signature in presence of two witnesses.

JAMES H. IRWIN.

Witnesses:
 HALL KELLOGG WALLIS,
 GEORGE TRANER.